May 3, 1927.  R. L. MORRIS  1,627,056
SELF LOCKING LIQUID LEVEL GAUGE
Filed Jan. 3, 1924   2 Sheets-Sheet 2
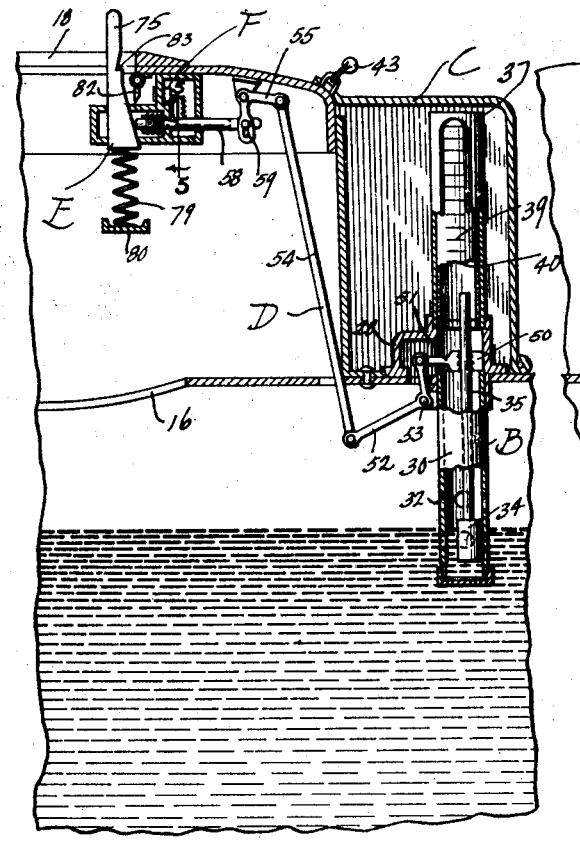
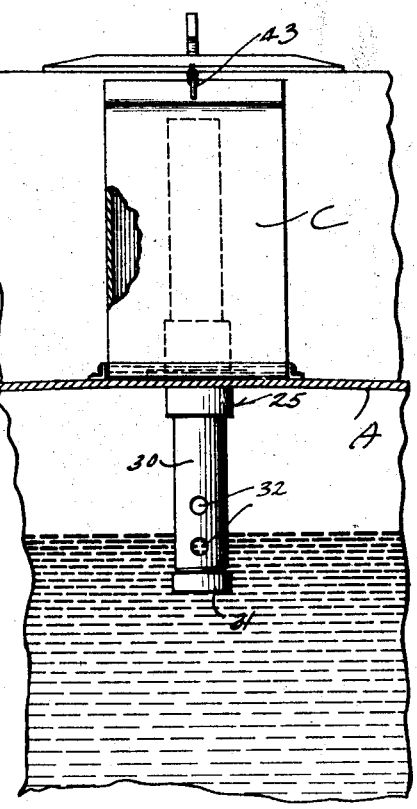
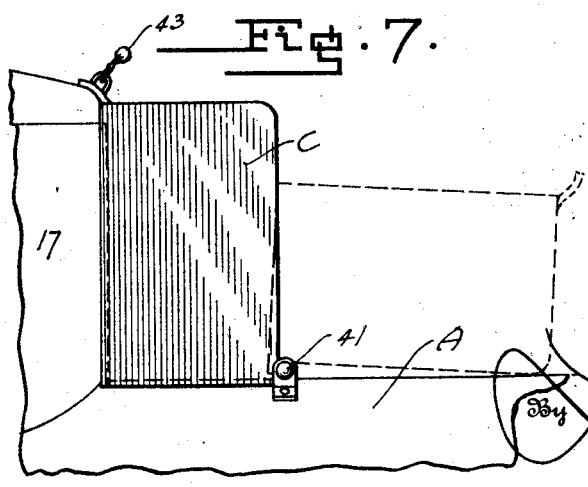
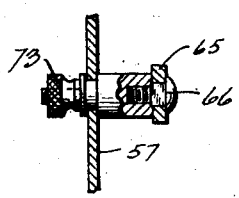
Inventor
Russell L. Morris
Attorney Patented May 3, 1927.

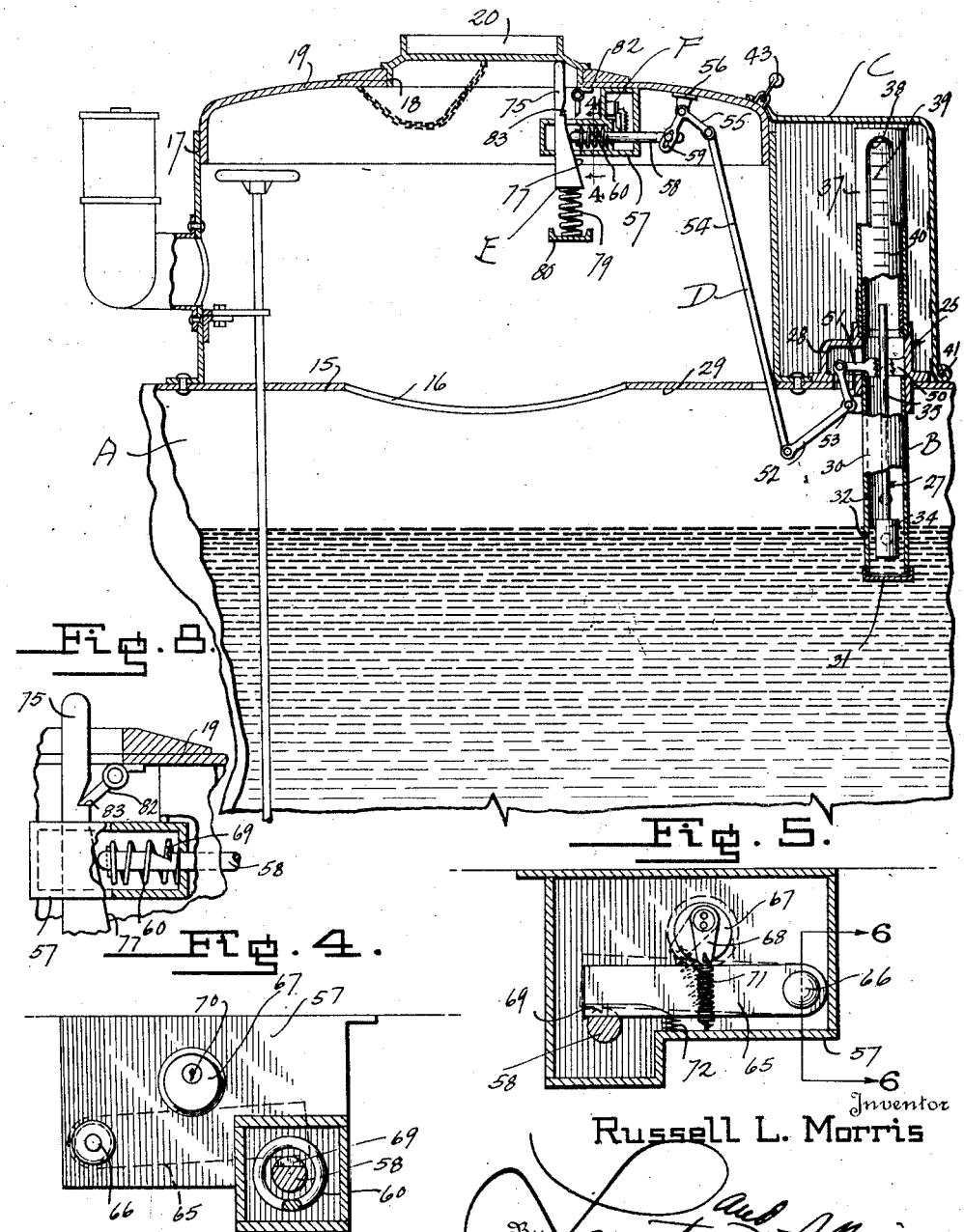

1,627,056

UNITED STATES PATENT OFFICE.

RUSSELL L. MORRIS, OF TULSA, OKLAHOMA.

SELF-LOCKING LIQUID-LEVEL GAUGE.

Application filed January 3, 1924. Serial No. 684,269.

This invention relates to improvements in liquid level gauges.

The primary object of this invention is the provision of a gauge which will automatically lock and register the amount of liquid in tank cars or other fluid storage receptacles, by the performance of a collateral operation, such as the removal or lifting up of the tank's dome or other closure.

During the transportation of liquids, such as gasoline, and like volatile liquids, considerable evaporation and leakage occurs, diminishing the quantity in the tank car during its transportation from the consignor to the consignee. It is the custom for the shipper to allow an outage rebate for such loss by evaporation or leakage. In the majority of instances the consignor is not represented when the tank car is received by the consignee, and the correct statement of the "outage" is contingent upon the carefulness with which the gauging is performed by the consignee and the honesty of the consignee. Incident to slip-shod methods of calculating loss and to dishonesty, the shipper sustains a considerable loss in great many instances. The cutomary manner of gauging the liquid in the tank car is to insert a pole to gauge the depth thereof. Where the tank car varies in dimenion this method of gauging is inaccurate. However, with the placement of the improved self locking gauge upon the tank car, the quantity of liquid in the car may be accurately ascertained both by the consignor and the consignee, and the gauge is so set by the consignor that the float may rise and fall with the liquid in the tank car, during transportation, so that the float at the time of reception of the tank car by the consignee accurately gauges the liquid level in the car. Upon removal of the closure from the tank car the gauge is automatically locked and the consignor has an accurate indication of the amount of liquid received by the consignee.

Other objects and advantages of this invention will be apparent during the course of the following detailed description.

In the accompanying drawings, forming a part of this specification, and wherein similar reference characters designate corresponding parts throughout the several views.

Figure 1 is a cross sectional view taken through a portion of a tank car, especially at the dome thereof, showing the application of the improved self locking gauge thereon, with the details appearing as they are arranged during transportation, and just prior to removal of the closure from the tank.

Fig. 2 is a view, partly fragmentary and in cross section, showing the detail illustrated in Figure 1 with the closure of the tank car removed to automatically lock the gauge float mechanism.

Fig. 3 is a fragmentary cross sectional view taken through details of the tank car, showing said cooperating details of the improved gauge.

Fig. 4 is a cross sectional view taken substantially on the line 4—4 of Figure 1.

Fig. 5 is a cross sectional view taken substantially on the line 5—5 of Figure 2.

Fig. 6 is a cross sectional view taken through a detail of the gauge lock mechanism, on the line 6—6 in Fig. 5.

Fig. 7 is a side elevation of a gauge casing or closure which may be removed to permit the facile inspection of the gauge reading, and Fig. 8 is an enlarged cross sectional view taken through cooperating details of the improved gauge lock mechanism.

In the drawings, wherein for the purpose of illustration is shown but the preferred embodiment of this invention the letter A may generally designate a receptacle such as a tank car, within which the improved gauge B may be placed for use as above indicated. The gauge casing or closure C may be used in connection with the gauge B to prevent unauthorized inspection and tampering therewith. In connection with details of the gauge B, means D is employed for engaging and holding the float mechanism of the gauge B; spring operated means E being provided for co-action against the float holding means D to normally actuate said means D for engaging the float means; and a lock F being provided to hold the means D in a locked float supporting relation.

The tank A for the most part preferably includes the ordinary cylindrical shaped tank body 15, which has the inlet opening 16 in the top thereof. A dome 17 may be provided in connection with the tank A, over the opening 16 in the body of said tank; said dome having an opening 18 in the top wall 19 thereof, within which a closure member or lid 20 may be placed.

Referring to details of the gauge per se, the same is preferably carried by the body 15 of the tank A, adjacent the dome 17, and includes a casing structure 25 within which float means 27 is reciprocably mounted. The casing structure 25 preferably includes the attaching bracket or body portion 28, which is mounted exteriorly upon the tank body 15, and which has a portion depending into the compartment 29 of the tank, for receiving in a rigid relation a depending tube 30 which extends vertically into said casing, and which has the bottom 31 thereof enclosed, and has lateral ducts 32 through which the liquid in the compartment 29 may pass for actuating the float means 27. The float means 27 preferably includes the buoyant float 34 upon which a stem 35 is carried in upwardly extending relation to the casing construction 25. A casing tube 37 is preferably carried by the body 28 exteriorly of the compartment 29, and laterally of the dome 17, which has an elongated slot or opening 38 therein for exposing certain graduations 39 which are carried upon a transparent tube 40 within the upper section 37 of the casing construction 25.

The casing structure 25 and float means 27 of the gauge are of course carried by the tank A laterally of the dome 17, and the casing or closure member C is pivotally carried, as at 41, by the tank A, so that it may swing upwardly against the dome 17 to enclose the graduated portion of the gauge casing therein. A suitable hasp structure may be used for locking the casing C in a set relation, and this may be sealed, as at 43, to prevent unauthorized inspection or tampering with respect to the gauge. The operation of the float means 27 in the casing structure 25 is obvious. The upper edge of the stem 35 is used for designating the particular delineation 39 for indicating the level of the fluid within the tank A.

Referring to the float holding means D, the same preferably comprises a stationary jaw 50 carried within the body 28 of the casing structure 25, at one side of the float stem 35. A movable jaw arm 51 is carried by one end of a bell crank lever 52 which is pivotally mounted at 53. The other end of the bell crank lever 52 is connected by a rod 54 to one end of a second bell crank lever 55 which is carried by a suitable bracket 56 beneath the dome wall 19. Of course, the connecting rod 54 extends from the bell crank 52 upwardly through the tank body 15 into the dome compartment. Beneath the dome top wall 19, and adjacent the opening 18 therein, a protecting casing or housing 57 is carried, which slidably supports a horizontally disposed rod 58 therein. The inner end of this rod 58 is connected in a slot 59 at the end of the bell crank lever 55 opposite to that end to which the connecting link 54 is affixed, and in the casing 57, a spring 60 is disposed which normally acts against this casing and against the rod 58 to normally force the rod inwardly of the casing 57, and thus tending to move the bell cranks 52 and 55 and the connecting lever 54 so that the movable jaw 51 is moved out of engagement with the float stem 35.

Referring to the lock mechanism F, the same preferably includes a bolt or latch member 65 which is pivotally connected, as at 66, within the enclosing casing 57. A lock tumbler mechanism 67 is carried by the casing 57, having a cam 68 thereon which is adapted for cooperation against the bolt 65 when it is desired to lock the bolt 65 into a notch 69 which is provided in the sliding rod 58. The tumbler mechanism 67 is, of course, key operated, and provides a key inserting opening 70 which is exposed on the casing 57, so that a person merely by inserting a key through the opening 18 of the dome 17 can readily regulate position of the cam 68 with respect to the bolt 65. A spring 71 is connected at the free end of the cam 68 and to the enclosing casing 57, normally tending to draw the cam 68 downward to engage the bolt 65 to force the same against the sliding rod 58, so that as the rod 58 moves in its casing said bolt may move readily into the notch 69. A spring 72 may cooperate between the bolt 65 and the casing 57 being normally under compression to force the latch or bolt 65 out of the notch 69 when the cam 68 is in the position illustrated by dotted lines in Figure 5 of the drawings. A knob 73 may extend from the pivotal mounting 66 of the bolt 65 for manual adjustment of said bolt.

Referring to the closure operated means E, the same preferably comprises a reciprocating control member 75, carried by the casing 57 for vertical reciprocation therein, and which has a cam surface 77 thereon inclined so that the end of the rod 58 may ride thereon. A spring 79 under compression rests upon a bracket 80 supported in the tank dome 17, and engages the member 75, normally tending to move the same upwardly within the casing 57. Thus, the tendency of the spring 79 is to force the rod 58 outwardly from the casing 57, so that the lock bolt 65 may drop into the notch 69. To retain the member 75 inoperative when the lid 28 is open, a detent 82 is pivotally carried by the dome 17 adjacent the opening 18 therein, which is adapted to operate within a suitable notch 83 in the member 75. This detent 82 can only cooperate in the notch 83 for holding the member 75 depressed for a sufficient distance when the closure 20 is removed from the dome 17, and in this instance the bolt 65 will not as yet engage in the notch 69 of the rod 58. However, when the closure member 20 is placed in the opening 18 of the dome 17, it engages the member 75 to further depress the same, whereupon the detent 82 incident to gravity will drop out of the notch 83, and the spring 60 will force the rod 58 so that the movable jaw 51 is withdrawn from adjacent the float stem 35, to permit free operation of the float means 27.

Referring to the operation of the improved self locking gauge, the tank car A is filled, and with the detent 82 holding the member 75 in a depressed relation in the casing 57, the float mechanism 27 may operate to indicate to the shipper or the consignor how much liquid is in the tank A. When the consignor places the closure 20 on the dome 17, the member 75 is depressed as above indicated to release the detent 82. The tank car is then sealed and placed intransit. When the consignee receives the tank car, opening of the dome lid 20 will permit the spring 79 to force the member 75 upward, and the rod 58 riding on the cam surface 77 will be forced outwardly from the casing 57 until the bolt 65 locks the rod 58 by dropping into the notch 69. This movement of the rod 58 through the medium of the means D will cause the movable jaw 51 to force the float stem 35 against the stationary jaw 50, and the float means 27 will be automatically locked within the gauge casing structure 25. The float means cannot be displaced or tampered with, and it remains in this condition until the consignor or his representative can break the seal 43 and determine the locked reading of the gauge. Merely by subtracting the reading of the gauge when received by the consignee from the original reading taken by the consignor, the quantity of liquid wasted by leakage or evaporation can be determined, and the rebate accurately fixed.

Various changes in the shape, size, and arrangement of parts may be made to the form of the invention herein shown and described, without departing from the spirit of the same or the scope of the claims.

I claim:

1. In combination with a tank including a closure, a float device in the tank for indicating liquid level, jaw means for gripping the float to hold it in a supported position within the tank, a lock for holding said jaw means in float gripping relation, and spring operated means normally acting to hold said jaw means in non-locking relation.

2. In combination with a liquid receiving tank including a closure member, a casing carried by the tank, a float movable in the casing to indicate liquid level in the tank, and jaw gripping means operable by positioning of the closure member on said tank to release the float when the closure member is placed on the tank and to grip the float for locking it in a definite relation to its casing when the closure member is removed from said tank.

3. In a gauge of the class described the combination of a casing, float means including a buoyant element and a stem, a fixed jaw adjacent the stem, a movable jaw for clamping the stem against the fixed jaw, and means to actuate the movable jaw.

4. In a gauge of the class described the combination of a casing, float means including a buoyant element and a stem, a fixed jaw adjacent the stem, a movable jaw for clamping the stem against the fixed jaw, and lock means for holding the fixed jaw against said stem.

5. In a device of the class described the combination with a liquid receiving tank, a casing extending into and exteriorly of said tank, the lower or inner end of said casing being perforate for receiving liquid therein from the tank, float means operable in said casing adapted to rise and fall with liquid within the tank, said casing exteriorly of the tank having delineations thereon for gauge reading cooperation with said float means, and a closure carried by the tank for receiving the exterior portion of the casing in sealed relation therein.

6. In combination with a tank having an inlet opening and a closure therefor, a gauge carried by the tank including float means, means for fixing the float means with respect to the tank, including a spring operated member acting normally to fix the float with respect to the tank, said spring operated member being so located that upon placing of the closure in the opening of said tank the member will be engaged and held inoperative by said closure member to permit said float means to rise and fall with liquid level in the tank.

7. In combination with a tank having an inlet opening, a gauge comprising a casing portion and float means operable therein, gripping means for engaging the float means to hold it in a fixed relation with respect to the tank, a spring acting on said last mentioned means to permit free actuation of the float means with respect to the tank, a spring operated member extending into the inlet opening of said tank normally acting on said last mentioned means so that it will force said gripping means to engage said float means, and a closure for the inlet opening adapted when in position to engage and hold said spring operated member inoperative.

8. In combination with a tank having a closure therefor, a gauge including float means, gripping jaw means for engaging the float means to hold it in a fixed relation with respect to the tank, a slidable member for operating said gripping jaw means, a lock for engaging the sliding member at a predetermined point in its sliding movement to hold the gripping jaws in engagement with the float means, an operating member movably cooperating against said sliding member, a spring actuating the operating member to force the operating member against the closure whereby upon removal of the closure the force of the spring will move the operating member and incident to engagement of the latter with the sliding member to force the latter into a locking relation with said lock.

9. In a gauge of the class described the combination of a tank, a float device operable in the tank, a closure for the tank, means cooperatively interposed between the float device and closure, including means rendered operative upon removal of the closure to lock the float device in the position which it assumes on the liquid level in the tank just prior to removal of the closure, said float device having a portion thereof extending upwardly thru the tank so that readings may be taken exteriorly of the tank, and lock controlled means for enclosing the outwardly extending portion of the float device to seal the same against the taking of unauthorized readings.

10. In a self locking liquid level gauge for liquid tanks the combination with a liquid receiving tank having an inlet opening and a closure for said opening, a gauge carried by the tank including an indicating float means adapted to rise and fall with the liquid in the tank, float holding means, means cooperating with the float holding means to maintain the same inoperative and permit unimpeded operation of the float means, means cooperating with the closure to actuate said means cooperating with the float holding means only upon opening of the closure whereby to cause the last named means to hold the float means against movement and in the position it had assumed immediately prior to removal of the closure, and means to automatically lock said means cooperating with the float holding means against unauthorized unlocking upon actuation of the holding means to hold the float.

RUSSELL L. MORRIS.